United States Patent [19]

Goldstein

[11] Patent Number: 4,624,215

[45] Date of Patent: Nov. 25, 1986

[54] SYSTEM USED IN RAISING LIVESTOCK

[76] Inventor: Yehiel Goldstein, 16 Lohamay Hagetaot Street, Petah Tikva, Israel

[21] Appl. No.: 657,037

[22] Filed: Oct. 1, 1984

Related U.S. Application Data

[63] Continuation of Ser. No. 505,075, Jun. 16, 1983, abandoned.

[30] Foreign Application Priority Data

Jan. 5, 1983 [IL] Israel ................................ 67627

[51] Int. Cl.⁴ ............................................ A01K 45/00
[52] U.S. Cl. .................................................. 119/51 R
[58] Field of Search ......................... 119/51 R; 177/25

[56] References Cited

U.S. PATENT DOCUMENTS

| | | | |
|---|---|---|---|
| 3,303,822 | 2/1967 | Cohen | 119/51 R |
| 4,153,122 | 5/1979 | Engles et al. | 177/25 |
| 4,231,439 | 11/1980 | Hall, Jr. et al. | 177/25 |
| 4,288,856 | 9/1981 | Linseth | 119/51 R |
| 4,416,218 | 11/1983 | Holz | 119/51 R |

Primary Examiner—Hugh R. Chamblee
Attorney, Agent, or Firm—Toren, McGeady, Stanger, Goldberg & Kiel

[57] ABSTRACT

In determine and ascertain the physical state of birds and animals in a livestock raising establishment, the batches of such creatures are weighed at certain time intervals, the information on the weight of a bird or an animal is signalled to a computer and is stored in the memory of the latter, the average weight of a number of birds or animals is calculated which gives an indication of the physical state of the respective creatures. To practice the method a weighing apparatus is used including a weighing platform, a load cell attached to the said platform and being capable of converting the pressure of the load on the platform into an electric signal, and an electronic interface adapted to receive the signal and transmit it to a computer with wiring connecting the constituents of the system.

9 Claims, 1 Drawing Figure

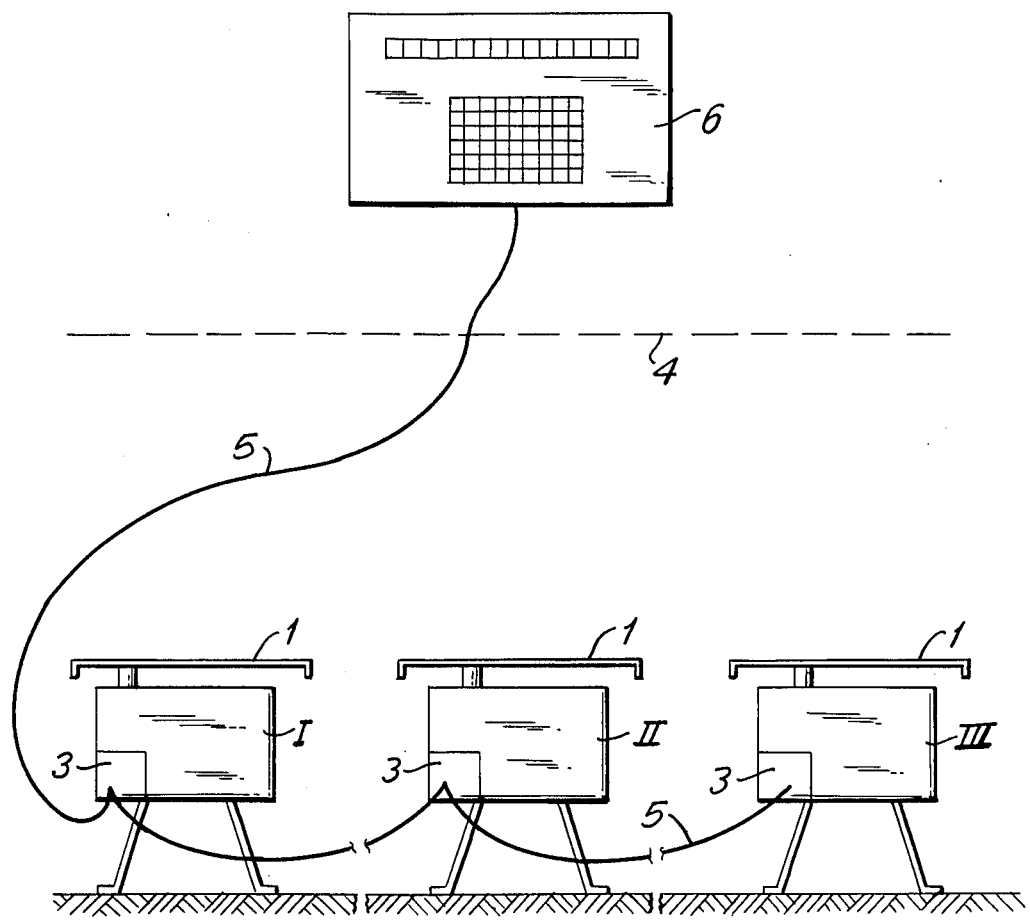

SYSTEM USED IN RAISING LIVESTOCK

This is a continuation of application Ser. No. 505,075, now abandoned, filed June 16, 1983.

FIELD OF INVENTION

This invention relates to raising livestock, particularly chickens, either for the production of meat or of eggs on an industrial scale. More particularly the invention is concerned with the constant survey of the condition of the birds (or animals as the case may be) in their respective locations or enclosures.

BACKGROUND OF INVENTION

In raising poultry birds, such as chickens chicken it is of utmost importance that the chicken farmer receives constant, up to date information on the state of health—and other factors—of, or connected with the fowl, whether the birds are destined—as broilers—for meat, or—as breeders—for the production of eggs.

Conventionally, the required information can be, and is, obtained by weighing the birds frequently. In the case of broilers the weight of a bird discloses information on the state of its health, its development and as a result of the latter permits to foresee possible future illness. It also indicates information on the quantities of feed required and makes it possible to plan dates of selling the fowl.

In the case of breeders, even greater care has to be exercised in supplying the exact amount of food required by the individual bird; this also can be determined by finding the exact weight of a bird.

Now, weighing birds in a poultry house where hundreds or thousands of chickens are raised is a rather time consuming, hard work. To prevent the introduction of disease into the poultry house the access to the latter is only permissible if an attendant intending to weigh birds dons clean, practically sterile garments and footwear. Once inside the poultry house, the attendant picks at random a number of birds, each of which is weighed, its weight being written down by the worker. At intervals of a few days this operation is attended to, about 2–4% of the total of the birds being weighed and the average weight, of the batch handled being determined. This average permits conclusions as to the condition of the birds, as referred to above.

OBJECT OF THE INVENTION

It is the object of the present invention to provide a method of obtaining the desired data in a more efficient way and with greater exactitude, at less working time. The means—of the electronic kind—are basically known, the invention residing in the use of such means in a novel manner, to attain the coveted results.

SHORT SUMMARY OF DISCLOSURE

In accordance with the present invention a system is provided for the survey of birds raised in a poultry house, the system comprises within the chicken house a weighing kapparatus including a weighing platform located at a level of not more than 50 cm above the ground on which the fowl move, a load cell is attached to the platform and is capable of converting the pressure of the load on the platform into an electrical signal, further, exteriorily relative to the chicken house, an electronic interface is provided which is adapted to receive the signal and to transmit it to a computer, with wiring connecting the constituents of the system.

In a practical embodiment of the invention, the computer used in the system comprises memory bits which record every weighing operation.

Preferably—and according to the number of birds in a specific poultry house—several weighing apparatus are placed in that house, all connected to and feeding the results of the weighing operations into the same computer.

It has been found that it is in the nature of chickens to jump onto elevated objects the height of which is 40–50 cm from the ground, for which reason the platforms of the weighing apparatus should not be higher above the ground than 50 cm.

DESCRIPTION OF A PREFERRED EMBODIMENT

The invention will now be described by way of example with reference to the single drawing FIGURE, displaying a schematic layout of the new arrangement.

Within a poultry house a number of weighing apparatus are positioned three such apparatus in the example shown in the drawing. The weighing apparatus are indicated by the numerals I, II and III, but it should be clear that less than three or more than three weighing apparatus could be provided, depending on the number of birds in that house. Each apparatus I, II, III carries a platform 1 and is fitted with a load cell, which is in communication with an electronic interface 3, provicded for each of the weighing apparatus I, II, III. The poultry house in which the apparatus have been installed, is partitioned or closed off from the outside by a wall symbolized by a broken line 4. Cables 5 lead out of the poultry house to a central computer 6.

With the arrangement just described, the person in charge of the respective chicken house, no longer needs enter the house and choose a number of chickens to weigh them, note the weight of each bird and then draw conclusions from the average derived from the obtained total of weight of that number of birds checked.

The work of the poultry farmer is facilitated, as has been mentioned since chickens need not be placed on the weighing apparatus by a worker, instead they jump onto and off of the platform on their own. Thus the attendant has just to consult the computer which is not within the poultry house at intervals of a few days, and by working the keyboard the attendant can obtain the data stored in the memory, relating to each of the weighing apparatus and, considering the average weight determined from each weighing aparatus for a given day, he can obtain the required information and arrive at conclusions which would govern decision as to the manner of treatment to be given to the fowl.

While in the above reference has been had mainly to the application of the invention to chicken raising, it can be applied to other livestock as well. Obviously certain other animals would not be expected to mount the weighing apparatus; they have to be led to such apparatus and the platforms have to be arranged accordingly, that is, flush with the floor of the respective premises.

In the case of employing the new system for weighing chickens, conventional means, such as used in egg laying nests may be employed, for causing chickens to leave the weighing platform.

I claim:

1. A method of determining the state of poultry birds raised in a closed poultry house with a floor on which the birds stand comprising the steps of:
   (a) providing a weighing apparatus with an elevated platform including with a load cell with the platform spaced upwardly from the floor of the poultry house at a height at which the birds are capable of jumping from the floor onto the platform,
   (b) permitting the birds to jump randomly onto the platform,
   (c) obtaining a signal for each bird jumping onto the platform indicating the weight of the bird,
   (d) transmitting the obtained signal to a computer, and
   (e) calculating the average of the weights of the random number of birds weighed and based on such data determining information on the physical state of the birds in the poultry house.

2. A method, as set forth in claim 1, including the step of locating the computer outside of the poultry house.

3. A method, as set forth in claim 1, including the step of locating the platform in the range of 40 to 50 cm above the floor of the poultry house.

4. A system for surveying the conditions of poultry birds comprising a closed poultry house arranged to house a great number of poultry birds, said poultry house having a floor on which the birds stand, at least one weighing platform located in said poultry house with the platform spaced upwardly from the poultry floor to a height at which the birds are capable of jumping from the floor onto the platform, a load cell incorporated in said platform for converting the pressure of the load on the platform when a bird jumps randomly thereon into an electrical signal, a computer, an electronic interface adapted to receive the signal from said load cell and to transmit the signal to said computer, and means for interconnecting said load cell said electronic interface and said computer.

5. A system, as set forth in claim 4, wherein said poultry house is a house for raising chickens, said platform being located at a height above the floor of the poultry house not in excess of 50 cm.

6. A system, as set forth in claim 5, wherein the height of said platform above the floor of said poultry house is in the range of 40 to 50 cm.

7. A system, as set forth in claim 4, wherein said computer being located exteriorly of said poultry house.

8. A system, as set forth in claim 4, wherein a plurality of said weighing platforms are located within said poultry house with said platforms being spaced apart.

9. A system, as set forth in claim 4, wherein said computer includes memory bits.

* * * * *